(12) United States Patent
Rossetto et al.

(10) Patent No.: US 12,093,841 B2
(45) Date of Patent: Sep. 17, 2024

(54) METHOD AND SYSTEM FOR AUTOMATIC ERROR DIAGNOSIS IN A TEST ENVIRONMENT

(71) Applicant: Rohde & Schwarz GmbH & Co. KG, Munich (DE)

(72) Inventors: Francesco Rossetto, Vaterstetten (DE); Ghassen Benhadjsalah, Munich (DE); Lorenz Raedler, Munich (DE); Ingo Gruber, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 613 days.

(21) Appl. No.: 16/600,151

(22) Filed: Oct. 11, 2019

(65) Prior Publication Data

US 2021/0110284 A1    Apr. 15, 2021

(51) Int. Cl.
*G06N 5/04* (2023.01)
*G06F 11/22* (2006.01)
*G06F 16/25* (2019.01)
*G06N 20/00* (2019.01)

(52) U.S. Cl.
CPC .......... *G06N 5/04* (2013.01); *G06F 11/2257* (2013.01); *G06F 11/2268* (2013.01); *G06F 16/258* (2019.01); *G06N 20/00* (2019.01)

(58) Field of Classification Search
CPC ........................................................ G06N 5/04
USPC ........................................................... 707/672
See application file for complete search history.

(56) References Cited

U.S. PATENT DOCUMENTS

| 10,685,292 | B1* | 6/2020 | Milo | G06N 20/00 |
|---|---|---|---|---|
| 2017/0139806 | A1 | 5/2017 | Xu et al. | |
| 2019/0196950 | A1* | 6/2019 | Ranganathan | G06F 8/10 |
| 2019/0340512 | A1* | 11/2019 | Vidal | G06F 11/3664 |

FOREIGN PATENT DOCUMENTS

| CN | 106156079 A | | 11/2016 |
|---|---|---|---|
| CN | 109753426 A | * | 5/2019 |
| CN | 109861844 A | | 6/2019 |
| EP | 3278243 A1 | | 2/2018 |
| JP | 2017049854 A | | 3/2017 |
| WO | 2016161381 A1 | | 10/2016 |
| WO | 201787591 A1 | | 5/2017 |

* cited by examiner

*Primary Examiner* — Syling Yen
(74) *Attorney, Agent, or Firm* — DITTHAVONG, STEINER & MLOTKOWSKI

(57) ABSTRACT

A method for automatic error diagnosis in a test environment is provided. The method comprises the step of providing a plurality of test logs associated with known types of failures, each comprising a set of files. The method further comprises the step of arranging the plurality of test logs in a defect database. Moreover, the method comprises the step of transforming the set of files of the plurality of test logs into vectors adapted to be fed into a machine learning model.

11 Claims, 4 Drawing Sheets

METHOD AND SYSTEM FOR AUTOMATIC ERROR DIAGNOSIS IN A TEST ENVIRONMENT

TECHNICAL FIELD

The invention relates to automatic error diagnosis in a test environment, especially for facilitating an intelligent regression environment for communication device testing systems.

BACKGROUND ART

Generally, in a testing environment, a plurality of tests are executed according to a certain schedule. Each execution of a specific test generates a plurality of files. The set of files generated for the specific execution of a test are arranged in a test log. Moreover, a verdict is evaluated at the end of the test log execution that declares whether the test purpose is successfully passed or not. Although, the verdict does not convey the reason behind the failure in case the test purpose is not passed. Post-processing of such test logs provides substantial insights regarding not only the nature of the failure but also the reason behind it. Usually, log data analyzing systems are incorporated with a vast usage of scripts, which require a significant amount of time and human intervention.

Automated detection systems for log data analysis utilize machine intelligence by training machine learning models in order to reduce the overall execution time. For example, the document US 2017/0139806 A1 shows an automated detection system for processing log streams from applications, sensors or instruments. However, the detection system is limited to anomaly detection in order to generate an anomaly alert from the applications, sensors or instruments running a production system.

Accordingly, there is a need to provide a method and a system for automatic recognition of failures in test logs with least possible human intervention.

SUMMARY OF THE INVENTION

According to a first aspect of the invention, a method for automatic error diagnosis in a test environment is provided. The method comprises the step of providing a plurality of test logs associated with known types of failures, each comprising a set of files. The method further comprises the step of arranging the plurality of test logs in a defect database. Moreover, the method comprises the step of transforming the set of files of the plurality of test logs into vectors adapted to be fed into a machine learning model.

Therefore, a defect database with known failures or defects is included in the regression environment, where each of them describes a certain reason why a test execution failed. Such a failure or defect can explicitly describe the reason for a test that does not achieve its purpose, for instance, a specific data throughput is not met for a device under test. Each defect is associated with a plurality of test logs, which failed due to some reason described in the defect. Each file in a single test log is transformed into a vector, i.e., the file is mapped to a set of numerical features, so that they can be fed into a machine learning model. In this context, if a test log comprises more than one file, the feature sets from the plurality of files are combined into a single feature set or a log feature set. Each log feature set is therefore labeled with the defect associated with the corresponding test log. As a result, an intelligent regression environment is provided for a test system, which facilitates automatic recognition of failures in test logs based on the defect database.

According to a first preferred implementation form of said first aspect of the invention, the method further comprises the step of selecting a part of the files for transformation based on a predefined criterion. Therefore, only the relevant parts of the files within a test log are selected for data pre-processing. The pre-defined criterion can be defined based on statistical observations of previous occurrences. Additionally or alternatively, the criterion can be defined empirically based on prior knowledge, intuition, experience, and so on.

According to a second preferred implementation form of said first aspect of the invention, the method further comprises the step of performing supervised training of the machine learning model based on the defect database. For example, a function can be computed that takes a multiplicity of the log feature sets as training examples and generates a mapping between a generic feature set and either one or multiple defects in the defect database. Thus, the machine learning model goes through a supervised learning process, while utilizing a set of labeled test logs for training.

According to a further preferred implementation form of said first aspect of the invention, the supervised training is based on the whole defect database or a part of the defect database. Advantageously, for instance, the whole or only a subset of software versions of the device under test can be utilized.

According to a further preferred implementation form of said first aspect of the invention, the method further comprises the step of providing a failed test log external to the defect database for error diagnosis. In this context, the failed test log, which does not belong to the defect database, corresponds to an unsuccessful test performed within the test environment. Alternatively, the failed test log may correspond to a test performed in any communication device testing environment.

According to a further preferred implementation form of said first aspect of the invention, the method further comprises the step of classifying the failed test log by means of the machine learning model with respect to the known types of failures of the defect database. Advantageously, the machine learning model identifies the failed test log and utilizes the supervised training in order to map the failed test log into either one or multiple defects in the defect database.

According to a further preferred implementation form of said first aspect of the invention, the method further comprises the step of identifying, by means of the machine learning model, if the failed test log does not correspond to any of the known types of failures of the defect database. Thus, the machine learning model is further able to determine whether or not the feature set can be mapped to any known defect in the database.

According to a further preferred implementation form of said first aspect of the invention, the method further comprises the step of incorporating additional test logs into the defect database thereby updating the defect database periodically. Advantageously, the performance of the regression environment is significantly enhanced.

According to a further preferred implementation form of said first aspect of the invention, the method further comprises the step of retraining the machine learning model corresponding to the updated defect database. Advantageously, the machine learning model can be retained in order to learn, for instance, a new defect or failure category.

According to a further preferred implementation form of said first aspect of the invention, the set of files belonging to a given test log are in heterogeneous nature. Advantageously, the files may be of different types, e.g., text files, protocol message types, binary dumps, and so on.

According to a second aspect of the invention, a system for automatic error diagnosis in a test environment is provided. The system comprises a defect database comprising a plurality of test logs associated with known types of failures, each comprising a set of files. The system further comprises a storage unit configured to store the test logs of the defect database. Moreover, the system comprises a processor connected to the storage unit, configured to transform the set of files of the plurality of test logs into vectors adapted to be fed into a machine learning model. Advantageously, an intelligent regression environment is provided for a test system, which facilitates automatic recognition of failures in test logs based on the defect database.

According to a first preferred implementation form of said second aspect of the invention, the processor is further configured to select a part of the files for transformation based on a predefined criterion. Therefore, only the relevant parts of the files within a test log are selected for data pre-processing.

According to a second preferred implementation form of said second aspect of the invention, the processor is further configured to perform supervised training of the machine learning model based on the defect database. Therefore, the machine learning model goes through a supervised learning process, while utilizing a set of labeled test logs for training.

According to a further preferred implementation form of said second aspect of the invention, the supervised training is based on the whole defect database or a part of the defect database. Advantageously, for instance, the whole or only a subset of software versions of the device under test can be utilized.

According to a further preferred implementation form of said second aspect of the invention, the system further comprises a user interface and wherein the user interface is configured to input a failed test log external to the defect database for error diagnosis. In this context, the failed test log, which does not belong to the defect database, corresponds to an unsuccessful test performed within the test environment. Alternatively, the user may input a failed test log corresponding to a test performed in any communication device testing environment.

According to a further preferred implementation form of said second aspect of the invention, the processor, by means of the machine learning model, is further configured to classify the failed test log with respect to the known types of failures of the defect database. Hence, the machine learning model identifies the failed test log and utilizes the supervised training in order to map the failed test log into either one or multiple defects in the defect database.

According to a further preferred implementation form of said second aspect of the invention, the processor, by means of the machine learning model, is further configured to identify if the failed test log does not correspond to any of the known types of failures of the defect database. Advantageously, the machine learning model is further able to determine whether or not the feature set can be mapped to any known defect in the database.

According to a further preferred implementation form of said second aspect of the invention, the user interface is further configured to input additional test logs into the defect database thereby updating the defect database periodically. Advantageously, the performance of the regression environment is significantly enhanced.

According to a further preferred implementation form of said second aspect of the invention, the user interface is further adapted to input the additional test logs in real-time. Therefore, the overall accuracy and reliability are further improved.

According to a further preferred implementation form of said second aspect of the invention, the processor is further configured to retrain the machine learning model corresponding to the updated defect database. Advantageously, the machine learning model can be retained in order to learn, for instance, a new defect or failure category.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. However, the following embodiments of the present invention may be variously modified and the range of the present invention is not limited by the following embodiments.

Figure 1:
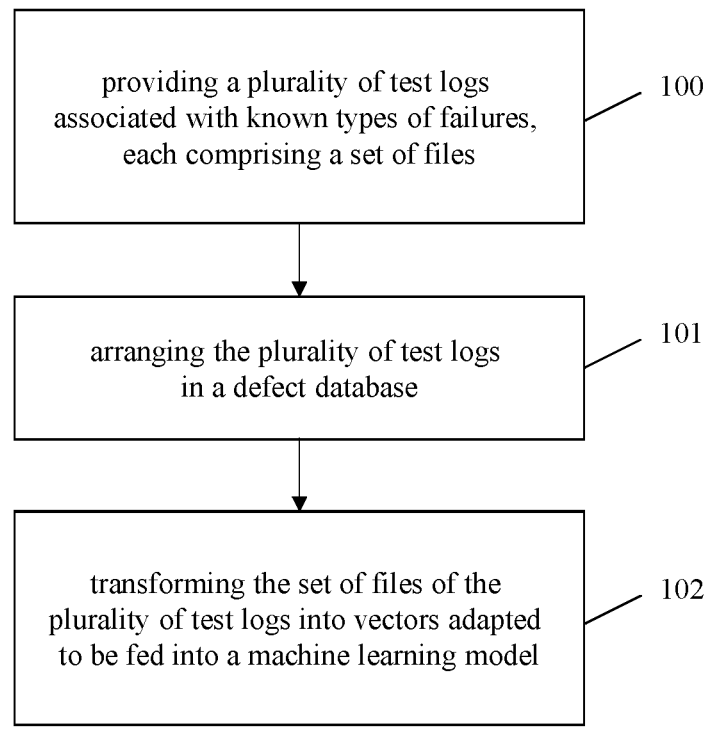
FIG. 1 shows an exemplary embodiment of the method according to the first aspect of the invention.

In FIG. 1, an exemplary embodiment of the method according to the first aspect of the invention is illustrated. In a first step 100, a plurality of test logs are provided that are associated with known types of failures, each comprising a set of files. In a second step 101, the plurality of test logs are arranged in a defect database. In a third step 102, the set of files of the plurality of test logs are transformed into vectors that are adapted to be fed into a machine learning model.

Figure 2:
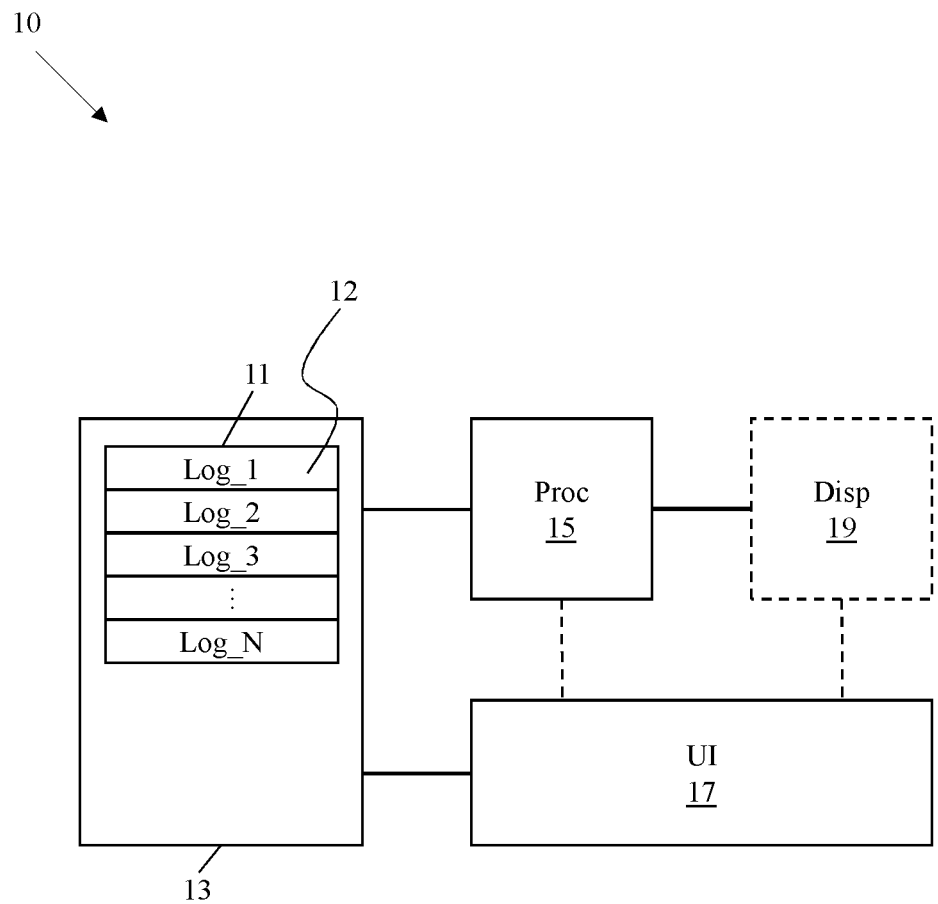
FIG. 2 shows an exemplary embodiment of the system according to the second aspect of the invention.

In FIG. 2, an exemplary embodiment of the system 10 according to the second aspect of the invention is illustrated. The system 10 comprises a defect database 11 comprising a plurality of test logs 12. The defect database 11 is essentially a database of known issues, each of them describing a certain reason for a failed execution of tests. The test logs 12 associated with the defect database 11 are stored in a storage unit or memory 13, either in an ordered or an unordered fashion. The system 10 further comprises a processor 15 and may optionally comprise a display 19. The processor 15 is connected to the storage unit 13 and further to the display 19. Moreover, the system 10 comprises a user interface 17 connected to the storage unit 13 and further respectively to the processor 15 and the display 19.

In this context, the processor 15 may also be referred to as microcontrollers, microprocessors, microcomputers, etc., which may further be configured in hardware, firmware, software, or a combination thereof. The storage unit 13 can further store the programs required for processing and controlling of the processor 15 and temporarily store input and output information. Therefore, the storage unit 13 may be implemented into a flash memory-type storage medium, a hard disc-type storage medium, a card-type memory, a Random Access Memory (RAM), a Read-Only Memory (ROM), or the like.

A user may input control commands through the user interface 17 in order to provide control signals for the processor 15 and/or to manipulate the results displayed on the display 19. Test logs can also be inputted through the user interface 17 into the storage unit 13, either individually or collectively. Moreover, test logs external to the database 11, which are required to be analyzed by the processor 15, are also fed through the user interface 17, either mediating via the storage unit 13 or directly into the processor 15. Such inputs can be provided in formats that are known in the art, such as a text file, an XML file and the like. In addition to this or as an alternative, the display 19 may be incorporated with the user interface 17, such as a graphical user interface, where the user can perform the foregoing actions through direct manipulation of graphical elements.

Figure 3:
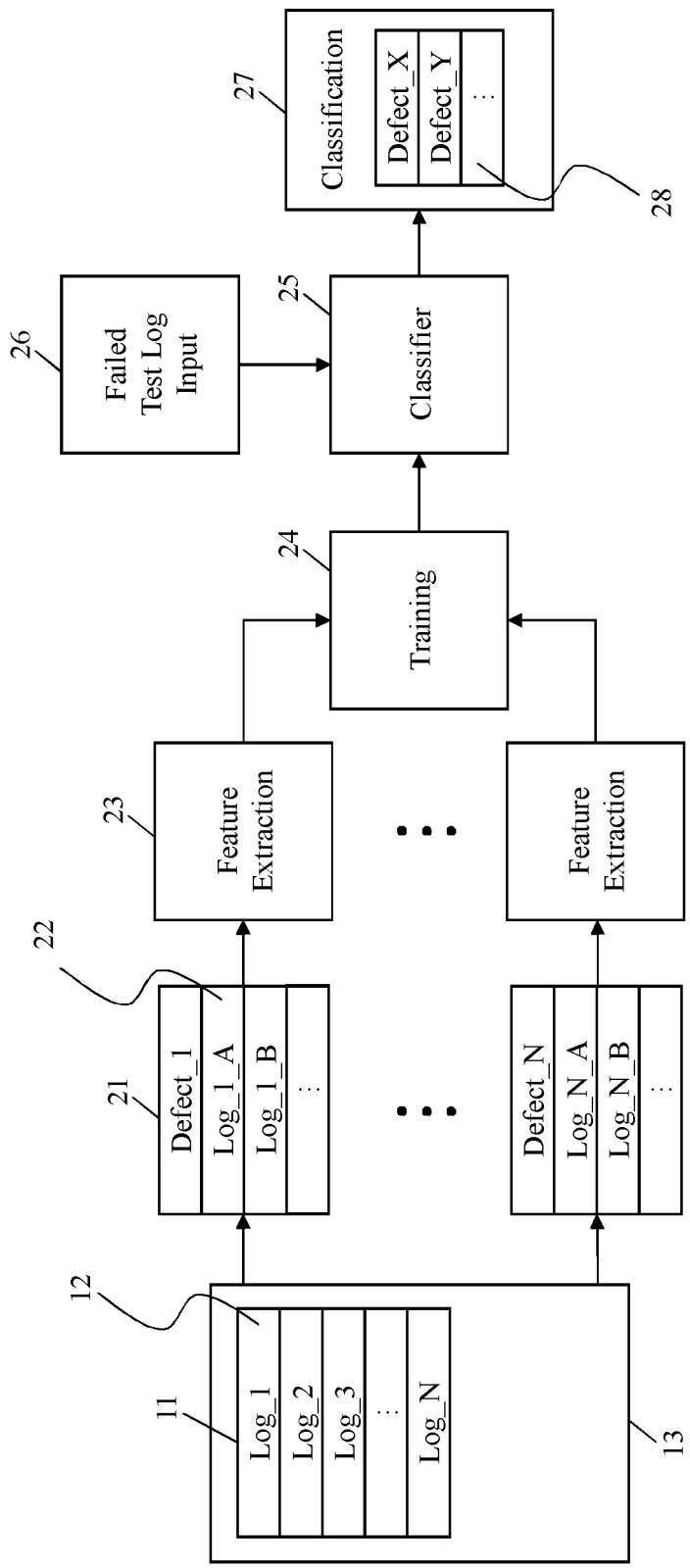
FIG. 3 shows a first exemplary embodiment of error diagnosis process.

In FIG. 3, a first exemplary embodiment of error diagnosis process is illustrated in blocks. Here, the defect database 11 and the test logs 12 are illustrated in detail. Each test log 12, (e.g., Log_1, Log_2, Log_3, . . . , Log_N) is associated to a specific failure or defect 21 (e.g., Defect_1, . . . , Defect_N), where the test log 12 may comprise a single file or a set of files 22 (e.g., Log_1_A, Log_1_B, . . . resp. Log_N_A, Log_N_B, . . . ). The processor 15 performs feature extraction 23 on the test logs 12 based on the associated category or type of defects 21.

For instance, the processor 15 may execute a computer program that maps each file 22 in a single test log 12 to a set of numerical features. In the case a test log 12 comprises a set of files 22, the program combines the feature sets from the set of files 22 into a single feature set and may define the single feature set as log feature set. Each log feature set then can be labeled with the defect 21 associated with the corresponding test log 12. Such labeling of test logs 12 with their associated defects 21 facilitates supervised training of a machine learning model.

At this point, the processor 15 performs supervised training of the machine learning model. For instance, the processor 15 may execute a computer program that computes a function, which takes a multiplicity of the log feature sets and generates a mapping between a generic feature set and either one or multiple defects 21 in the defect database 11. Additionally, the function may take a multiplicity of the log feature sets and reports that the feature set cannot be mapped to any known defect 21 in the defect database 11.

Upon formulating the function for training 24, the processor is able to diagnosis an external failed test log 26 corresponding to an unsuccessful test run, which does not belong to the defect database 11. For instance, the processor 15 may execute a computer program that takes the failed test log 26 and by means of the function computed during the supervised training 24, the program maps 25 the failed test log 26 into either one or multiple defects 21 in the defect database 11. The program may then classify 27 the failed test log 26 according to the known defect categories 28 (e.g., Defect_X, Defect_Y, . . . ).

It is to be noted that additional test logs can be included into the defect database 11, preferably in real-time, in order to enhance the error diagnosis performance or to learn a new defect category. Therefore, the error diagnosis scheme facilitates automatic self-tuning system where the machine learning model can learn from known defects of test logs in order to identify as well as to classify defects for an external test log.

Figure 4:
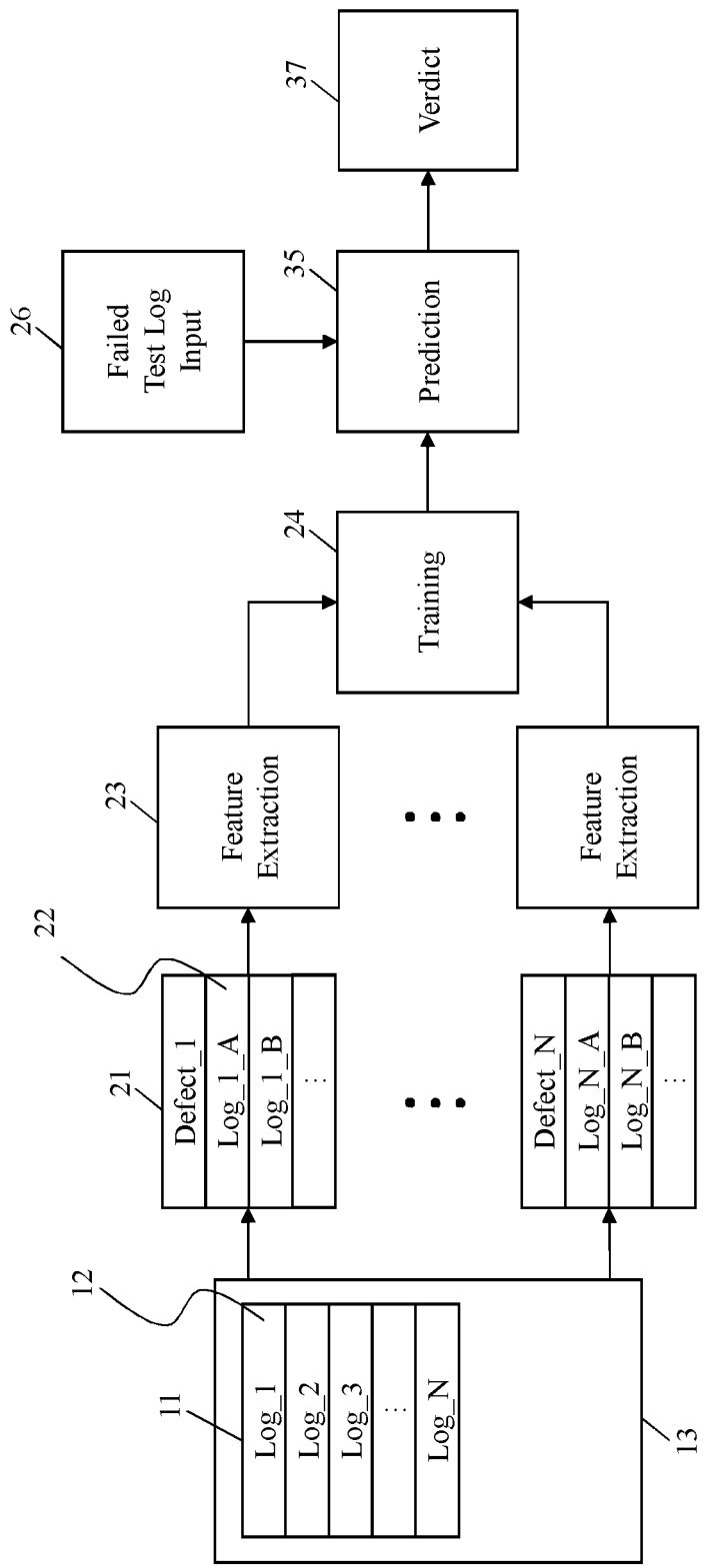
FIG. 4 shows a second exemplary embodiment of error diagnosis process.

In FIG. 4, a second exemplary embodiment of error diagnosis process is illustrated in blocks. The process illustrated herein differs from the process of FIG. 3 in that the processor 15 performs prediction 35 on the failed test log 26 in order to reach to a verdict 37 whether the failed test log 26 corresponds to any of the known defects 21. In this regard, the processor 15 may execute a computer program that takes the failed test log 26 and uses the function computed during the supervised training 24 for the prediction 35. Upon reaching a verdict 37, the program may report that the failed test log 26 cannot be mapped to any known defects 21 in the defect database 11. Hence, the processor 15 is able to train the machine learning model based on the defect database 11 in order to predict a known failure of a failed test log 26 or to reach to the conclusion that the failure is not known to the diagnosis process.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for automatic error diagnosis in a communication device testing environment comprises the steps of:
   providing a plurality of test logs associated with known types of failures, each comprising a set of files;
   arranging the plurality of test logs in a defect database;
   transforming the set of files of the plurality of test logs into vectors adapted to be fed into a machine learning model;
   selecting a part of the files for transformation based on a predefined criterion;
   providing a failed test log external to the defect database for error diagnosis, wherein the failed test log corresponds to a test performed in the communication device testing environment; and
   classifying the failed test log by means of the machine learning model with respect to the known types of failures of the defect database,
   wherein each test log is associated to a specific defect category,
   wherein the method further comprises classifying the failed test log according to the defect category, and wherein the method further comprises the step of incorporating additional test logs in real-time into the defect database thereby updating the defect database periodically.

2. The method according to claim 1,
wherein the method further comprises the step of performing supervised training of the machine learning model based on the defect database.

3. The method according to claim 2,
wherein the supervised training is based on the whole defect database or a part of the defect database.

4. The method according to claim 1,
wherein the method further comprises the step of identifying, by means of the machine learning model, if the failed test log does not correspond to any of the known types of failures of the defect database.

5. The method according to claim 1,
wherein the method further comprises the step of retraining the machine learning model corresponding to the updated defect database.

6. The method according to claim 1,
wherein the set of files belonging to a given test log are in heterogeneous nature.

7. A system for automatic error diagnosis in a communication device testing environment comprises:
- a defect database comprising a plurality of test logs associated with known types of failures, each comprising a set of files;
- a storage unit configured to store the test logs of the defect database;
- a processor connected to the storage unit, configured to transform the set of files of the plurality of test logs into vectors adapted to be fed into a machine learning model; and
- a user interface configured to input a failed test log external to the defect database for error diagnosis, wherein the failed test log corresponds to a test performed in the communication device testing environment, wherein the processor is further configured to select a part of the files for transformation based on a predefined criterion, wherein the processor, by means of the machine learning model, is further configured to classify the failed test log with respect to the known types of failures of the defect database, wherein each test log is associated to a specific defect category, wherein the processor is further configured to classify the failed test log according to the defect category, and wherein the user interface is further configured to input in real-time additional test logs into the defect database thereby updating the defect database periodically.

8. The system according to claim 7,
wherein the processor is further configured to perform supervised training of the machine learning model based on the defect database.

9. The system according to claim 8,
wherein the supervised training is based on the whole defect database or a part of the defect database.

10. The system according to claim 7,
wherein the processor, by means of the machine learning model, is further configured to identify if the failed test log does not correspond to any of the known types of failures of the defect database.

11. The system according to claim 7,
wherein the processor is further configured to retrain the machine learning model corresponding to the updated defect database.

* * * * *